Oct. 21, 1952 — A. B. HILDEBRANDT — 2,614,334
INCLINOMETER FOR BOREHOLES
Filed July 9, 1951 — 3 Sheets-Sheet 1

Alexander B. Hildebrandt, Inventor
By W. O. T. Heilman, Attorney

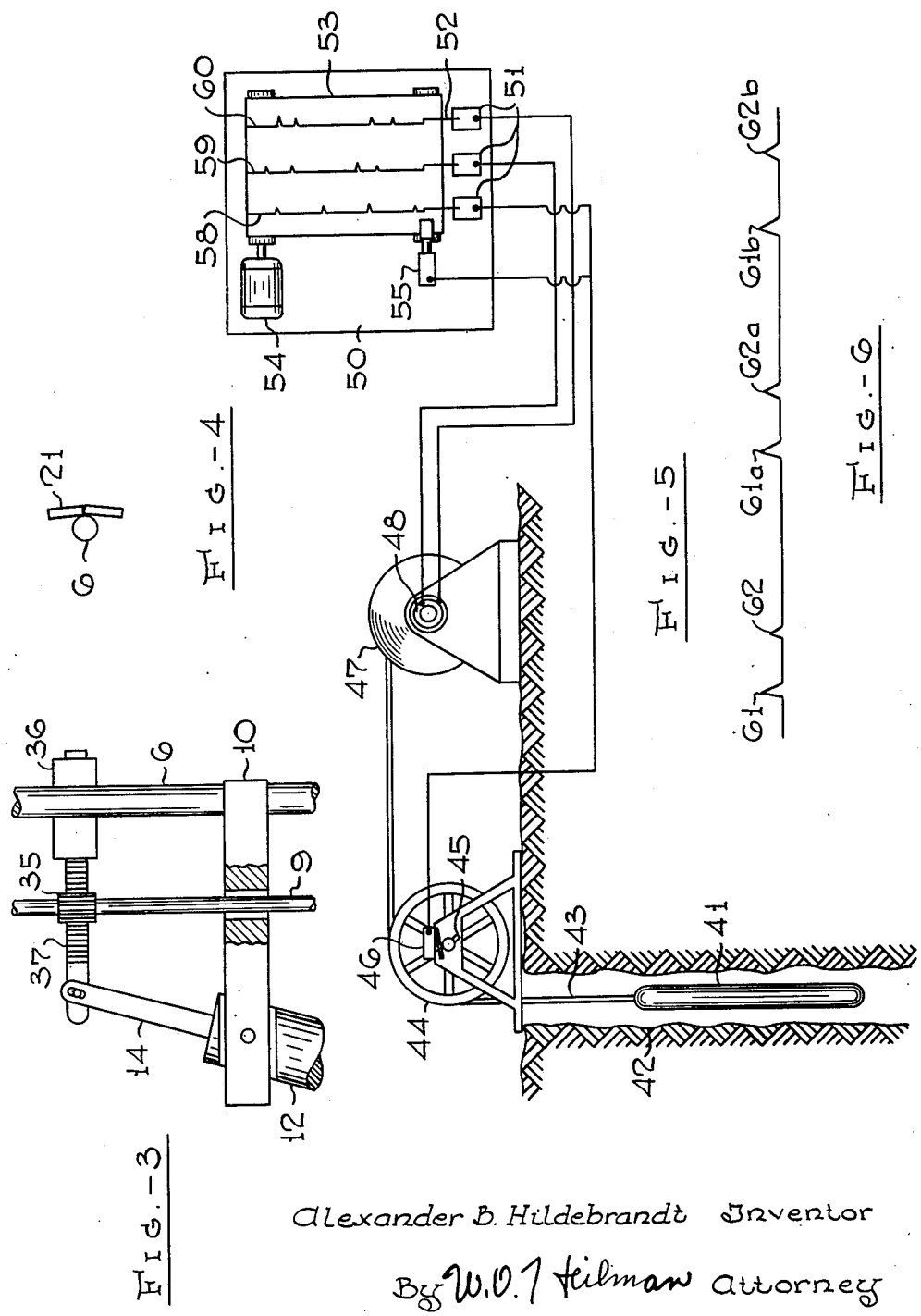

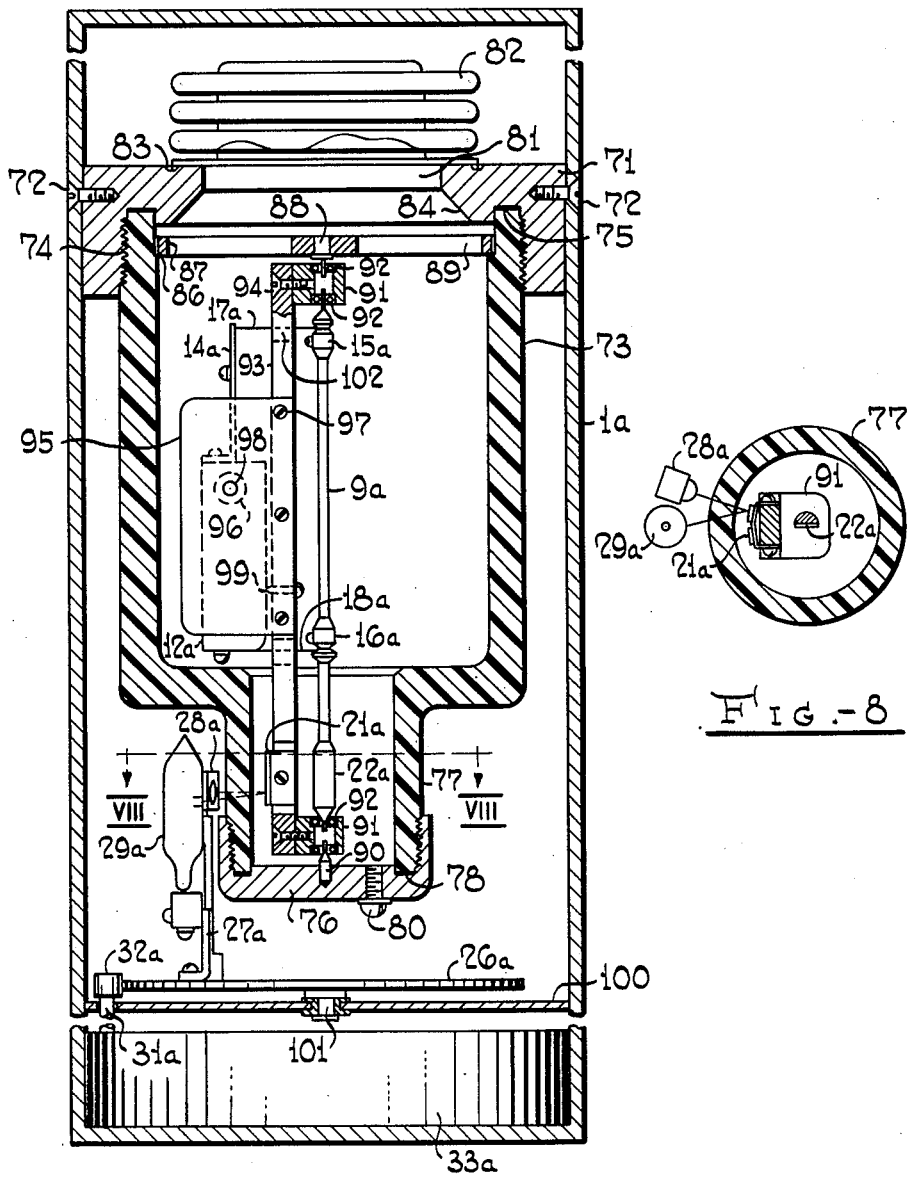

Patented Oct. 21, 1952

2,614,334

UNITED STATES PATENT OFFICE 2,614,334

INCLINOMETER FOR BOREHOLES

Alexander B. Hildebrandt, Tulsa, Okla., assignor to Standard Oil Development Company, a corporation of Delaware Application July 9, 1951, Serial No. 235,697

12 Claims. (Cl. 33—205)

This invention relates to a new and improved device for determining the extent of the inclination of an object from a vertical position. In particular the invention relates to an apparatus for determining at the surface of the earth the inclination of a well logging instrument or related device while it is in a well bore at any desired depth.

This application is a continuation-in-part of copending application Serial No. 72,515, filed January 24, 1949.

In modern day drilling of oil wells it is common practice to explore the hole during or after drilling in order to determine the nature of strata that have been encountered. In many well logging procedures it is important to know whether the measuring instrument is in a vertical position while measurements are being taken. For example, in apparatus that has been devised for determining the dip and strike of strata through which the hole has been bored it is obvious that the indicated value for dip must be corrected for the amount by which the instrument deviates from a vertical position at the time the measurement is made.

It is an object of the present invention to provide an improved apparatus for determining inclination from the vertical. It is a further object of this invention to provide an apparatus that may be used in combination with orientation devices to determine both the direction and the amount by which a bore hole or a device in the bore hole deviates from the vertical. It is still a further object to provide an apparatus which will measure and record this information continuously as the bore hole is traversed by the apparatus.

Briefly, the apparatus of the present invention comprises a pair of vertically disposed mirrors, one of which is adapted to rotate with respect to the other upon the moving of a pendulum, and a light source and a photosensative cell adapted to revolve about said mirrors so as to detect reflected light from each of the mirrors and thus indicate the amount of movement of the pendulum as a function of the angle through which one mirror has moved with respect to the other.

The nature and objects of this invention can be more fully understood from the ensuing description when considered in conjunction with the accompanying drawings in which:

Figures 3 and 4 show alternative details of design of some of the structural elements of the apparatus of Figure 1;

Figure 1:
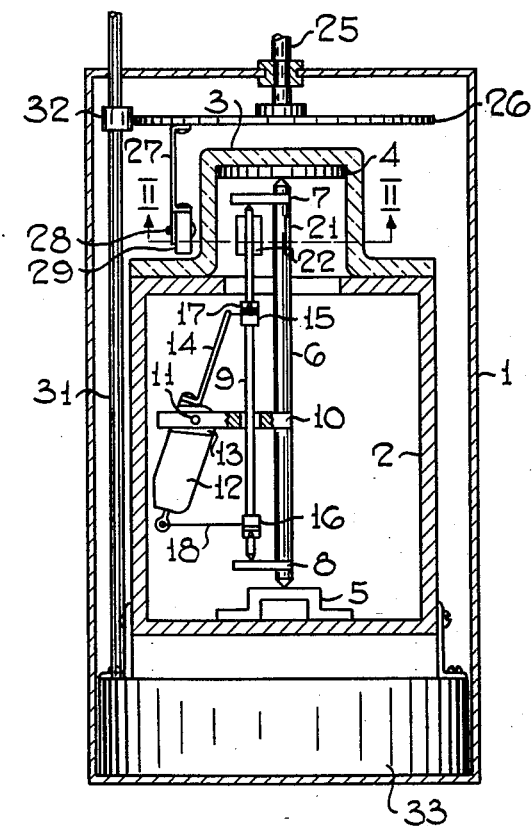
Figure 1 is an elevational view, partly in section, of one example of apparatus employing the present invention.

Figure 5 presents a schematic arrangement of apparatus on the earth's surface in conjunction with the inclination device of the present invention;

Figure 6 depicts a record of impulses transmitted from the apparatus of Figure 1 during actual use;

Figure 7 is an elevational view, partly in section, of a preferred form of apparatus embodying the present invention; and Figure 8 is a sectional plan view taken on line VIII—VIII of Figure 7.

Referring specifically to Figure 1, the apparatus illustrated may be suitably housed within a case 1 which may represent a portion of a larger or longer case containing other instruments to be used in conjunction therewith. It is to be understood that the case employed may be of any desired design and may be adapted for use in connection with any apparatus being used in a well bore. Disposed within case 1 and suitably fastened thereto is pendulum chamber 2 having mounted thereon a transparent cover 3. This cover may be constructed of shock-resistant glass or of any transparent plastic material having a softening point above the temperature to be encountered in the well.

Fitted within the top of the cover 3 is a bearing plate 4 which is preferably constructed of metal. At the bottom of chamber 2 and disposed in vertical relation to bearing plate 4 is bearing support 5, the bearings in plate 4 and support 5 holding between them rotatable shaft 6. Near the extremities of shaft 6 are brackets 7 and 8 having bearings receiving rotatable shaft 9 and holding it in essentially parallel relation to shaft 6. Attached to shaft 9 at points intermediate its ends are spools 15 and 16. Intermediate the ends of shaft 6 and fastened thereto is pendulum bracket 10 provided with an opening through which shaft 9 may pass. Pivotally supported on bracket 10 at pivot or fulcrum point 11 is pendulum 12 having a shoulder 13 which is adapted to rest against the underside of pendulum bracket 10 when the inclinometer unit is in a vertical position.

Extending upwardly from pendulum 12 is arm 14 to the upper end of which is attached a flexible line, such as a cord or wire 17, which winds around spool 15. A second cord or wire 18 is fastened to the lower end of pendulum 12 and winds around spool 16. Wires 17 and 18 are wound in opposite directions around spools 15 and 16 respectively so that as one wire is wound onto its respective spool the other wire will unwind from its spool. Thus, as pendulum 12 moves on its fulcrum it will cause shaft 9 to rotate.

Attached to the upper end of shaft 6 in a vertical position is mirror 21. A similar mirror 22 is attached vertically to the upper end of shaft 9. Mirrors 21 and 22 are set at a predetermined angle to each other when the apparatus is in a vertical position. This angle may be 90°, for example.

It will be seen that the entire assembly encased within chamber 2 and transparent cover 3 is adapted to swing freely on shaft 6 so that pendulum 12 will seek the lowest position as the unit is inclined. It will also be seen that as the unit is inclined from the vertical, pendulum 12 will swing outwardly on pivot 11 and thereby rotate mirror 22 through some angle with respect to mirror 21.

Alternatively, movement of pendulum 12 can be caused to rotate shaft 9 by means of a mechanism of the rack and pinion type as shown in Fig. 3. Pivotally attached to the end of pendulum arm 14 is a toothed member 37 the teeth of which engage the teeth of pinion gear 35 mounted on shaft 9, guide bracket 36 ensuring that the teeth will remain engaged. It is apparent that any movement of pendulum 12 on its fulcrum will result in the rotation of shaft 9.

Suitably supported above cover 3 is a shaft 25 to the lower end of which is fastened geared wheel 26. Suspended from wheel 26 is a bracket 27 to which are fastened a source of light 28 and a photo-sensitive cell 29, each of these elements being supported close to the exterior of transparent cover 3, and in such relation to each other that at some definite position of each of the mirrors 21 and 22 light from light source 28 will be reflected into photo-sensitive cell 29. Meshing with geared wheel 26 is a pinion gear 32, fastened to shaft 31. Shaft 31 is driven by power source 33, which may be a conventional spring-wound motor or a constant speed electric motor or the like. Shaft 31 may be suitably extended upwardly within case 1 to operate one or more other devices in synchronism with the inclinometer of this invention.

Figure 2:
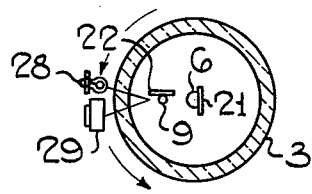
Figure 2 depicts a sectional view along the line II—II of Figure 1.

In operation, shaft 31 is driven by constant speed power source 33 and in turn causes wheel 26 to rotate at a constant speed and thus move light source 28 and photo-sensitive cell 29 around the circumference of transparent cover 3. As the two mirrors 21 and 22 intercept a light beam as depicted in Fig. 2 a pulse is generated in the light sensitive cell 29, which pulse when recorded at the surface will show the relative position of mirror 21 with respect to mirror 22. By using known devices for orientating the inclinometer unit with respect to the points of the compass the direction of inclination of the unit can be readily determined.

The embodiment of the invention shown in Fig. 1 represents a preferred type of construction of the inclinometer unit in that it provides a fluid-tight chamber which may be filled with oil or similar viscous liquid such as a polysilicone liquid to damp the movement of pendulum 12 on its fulcrum as well as the swinging of the pendulum on shaft 6. In this embodiment it is obvious that at least that portion of chamber 2 adjacent the mirrors must be transparent in order to allow light to enter from the light source 28 and be reflected back into cell 29. Thus, at least the sides of cover 3 must be of transparent material. The entire chamber could also be constructed of the same transparent material if desired although from a practical standpoint it may be preferable to have the major portion made of metal in order to impart sufficient mechanical strength to the unit.

In an embodiment wherein fluid damping is not considered necessary it is obvious that the special construction shown in Fig. 1 would not be needed and light source 28 and sensitive cell 29 could be housed within the same enclosure as the other elements of the inclinometer. For most satisfactory operation, however, the type of construction illustrated by Fig. 1 is preferred wherein the motion of the pendulum can be damped with a suitable fluid.

Conventional means can be used for supplying electric current to light source 28 and for conducting electric impulses from light sensitive cell 29 to a recording device at the surface. Such means will include the usual slip rings and sliding contacts to transfer current from the rotating portion of the device to the non-rotating cable. However, in order that the drawing will not be unduly complicated these means are not shown. The electric impulses received at the surface of the well can be recorded by conventional means, as for example by causing them to actuate a recording galvanometer which will produce a trace on a moving sheet of paper by means of an inking pen or on a moving photographic paper or film by means of a beam of light.

It is preferred that the paper or film in the recording means be fed through at a uniform rate so that interpretation of the records can be made both simple and accurate. A schematic arrangement of apparatus that may be used is shown in Fig. 5 wherein numeral 41 designates an instrument case being lowered into a bore hole in a formation 42 by means of a cable 43 which is fed over a measuring wheel 44. The measuring wheel may be of a convenient diameter so that an integral number of feet of cable, for example, 5 or 10 feet, will be fed over it for one rotation of the wheel. Affixed to wheel 44 is a pin 45 which is so placed that on each rotation of wheel 44, the pin will actuate switch or relay 46. Cable 43 carrying a sufficient number of electrical conductors to service the inclinometer unit as well as other measuring or indicating devices carried by instrument case 41 is wound onto reel 47 provided with slip rings 48 so that electrical contact can be made between the end of the cable 43 and recording instrument 50.

Instrument 50 has a plurality of galvanometers 51, each provided with means 52 to record a trace on moving paper 53. The paper is fed through the instrument at a constant rate of speed by means of motor 54. One of the galvanometers 51 is connected to relay 46 and serves to record the depth to which the instrument case 41 has been lowered. A mechanical counting device may be made an integral part of switch or relay 46 or, alternatively, switch or relay 46 may be made to actuate a separate counting device to indicate the depth to which case 41 has been lowered. As an added refinement, switch or relay 46 can also be made to actuate a numbering stamp 55 which will record the depth in feet directly on the record paper 53. Trace 58 on record paper 53 represents that made by operation of relay 46 to indicate the depth of instrument case 41. In like manner, trace 59 is that received from operation of the inclinometer unit of Fig. 1, and trace 60 that received from another device in case 41, as for example, an orientation device. It is to be understood that other traces may be made simultaneously to record information from other instruments used in conjunction with the inclinometer unit of the present invention, but these traces are not shown here.

Figure 6 depicts a representative trace recorded when operating the inclinometer of Fig. 1. On this trace the kicks designated by reference numerals 61, 61a, 61b, etc., indicate the pulses picked up by reflection from mirror 21 and the kicks designated by reference numerals 62, 62a, etc., represent pulses picked up from mirror 22. Since the paper is fed through the recording instrument at a uniform speed and since power source 43 drives light source 28 and sensitive cell 29 at a uniform speed the kicks 61 will be spaced at a uniform distance from each other and the distance measured on the paper from kick 61 to kick 62 will be directly proportional to the angular relationship between mirror 21 and mirror 22.

To measure the angle of inclination of the instrument in the bore hole it is merely necessary to ascertain the distance on the paper from kick 61 to kick 61a, and from kick 61 to kick 62 and then apply the ratio of these two differences in the following equation:

$$\alpha = 2A\frac{d_1}{d_2} - \frac{A}{2}$$

Assume that the instrument is set so that, as the pendulum moves through an angle of A degrees, mirror 22 rotates through an angle of 180 degrees; also assume that mirror 22 is set at an angle of 90 degrees from mirror 21 when the pendulum is in a vertical position or in its normal position with the shoulder 13 resting against bracket 10. Then let $d_1$ equal the distance between kick 61 and kick 62 on the trace paper of Fig. 6 and let $d_2$ equal the distance between kick 61 and kick 61a. If "A" equals the angle of swing of the pendulum from the vertical for 180 degrees of rotation of mirror 22 then the distance $d_2$ will be equivalent to the swing of the pendulum through an angle equal to 2A. Now if $\alpha$ equals the angle of inclination to be measured then it is obvious that $$\alpha = 2A\frac{d_1}{d_2} - \frac{A}{2}$$

If the instrument is set so that the pendulum in swinging 20 degrees will cause the mirror 22 to rotate through an angle of 180 degrees, i. e., if "A" equals 20 degrees, then, in the above equation:

$$\alpha = 40\frac{d_1}{d_2} - 10$$

Ordinarily there should be no difficulty in determining which kicks on the traced record are those received from mirror 22 for, when a constant film or paper speed is employed, the traces 61, 61a, etc., will normally be equidistant except while the pendulum 12 is swinging about on shaft 6. However, it may be desirable to have the kicks from one mirror to be of larger amplitude than those from the other mirror, as shown in Fig. 6. This can be accomplished conveniently by providing a film of filtering material on one mirror so that it will not reflect as much light as the other mirror. Another method of distinguishing reflections from the two mirrors is to make the mirror in two parts the plane surfaces of which are set at a small angle to each other, say of 3 to 25 degrees as shown in Fig. 4 in which case the kick from mirror 21 will be either double or of larger amplitude than the kick from mirror 22. Still another method, and one that will usually work satisfactorily, is merely to have one mirror larger in area than the other mirror. With mirrors of suitable size more light will be reflected from the larger mirror than from the smaller which will cause a larger impulse to be generated in light sensitive cell 29.

Instead of a constant speed motor for feeding moving film or paper 53, motor 54 may be a selsyn-type motor tied in with the rotation of reel 47 so that the paper 53 will be fed at a rate proportional to the rate of descent or ascent of instrument case 41 in the borehole. When using this alternative arrangement, interpretation of the record will not be difficult if instrument case 41 is raised or lowered at a fairly constant rate of speed. Trace 58 or numbering stamp 55 can likewise be used in this instance as a check on the indicated depth of the instrument case in the borehole.

The embodiment of the invention shown in Figures 1 and 2 suffers from a slight disadvantage in that as light source 28 and cell 29 revolve about case 3, their distance from mirror 22 varies. Obviously the geometry of the system is thus such that the angular position of the two mirrors is not perfectly linearly represented on the record chart. The difficulty is obviated in the preferred embodiment of the invention shown in Figure 7 which provides for a constant distance of the light source and cell from either mirror regardless of the position of the light source and cell. Other desirable features of this preferred embodiment will be evident from the ensuing description.

As in the embodiment of Figure 1 the apparatus is contained within the case 1a. Suitably fastened to the case within the upper portion thereof is an inclinometer supporting shelf 71 which may be fastened in place by screws 72. The bottom side of the inclinometer shelf is counterbored and the interior cylindrical wall of the counterbored recess is provided with threads 74 to permit the threaded attachment of a cylindrical transparent case 73. The latter may conveniently be made of a colorless transparent plastic such as that known by the trade name Paraplex, for example. A fluid tight seal 75 is provided between case 73 and shelf 71. Threadedly attached to the lower neck portion 77 of case 73 is a metal cap 76, the juncture of the cap and case likewise being provided with a fluid tight seal 78. Cap 76 is drilled and tapped to receive a filler screw 80 which may be removed from the case for filling with damping fluid when the inclinometer is removed from the case 1a and inverted.

The top surface of inclinometer shelf 70 is provided with a circular groove 83 which serves as a mounting recess to receive an expandable bellows 82 which may be soldered to the shelf adjacent the groove. A hole 81 is drilled through the shelf to establish fluid communication between the bellows and the interior of case 73. Preferably the lower portion of the hole has a 45° bevel 84 to permit air from being trapped under an otherwise square shoulder. Adjacent the upper end of case 73 a shoulder 86 is provided to receive a journal mounting plate 87, the latter having a journal 88 at its center. Three or four holes 89 are bored through plate 87 to permit fluid communication between case 73 and opening 81.

Centrally located on the inside of cap 76 a lower journal 90 is provided. A pair of bearing blocks

91 having roller bearings 92 co-axially aligned on opposite faces of the block are rotatably supported on journals 88 and 90. A central shaft 9a is rotatably supported between the bearing blocks, its journaled ends fitting into the remaining bearings of the bearing blocks. Supported in parallel relation to shaft 9a is a second shaft or bar 93 fastened to bearing blocks 91 by means of screws 94. A pair of rectangular damping plates 95 are fastened in essentially parallel vertical relation on opposite sides of bar 93 by means of screws 97. Each of the plates 95 has a bearing 96 which receives a journal 98 attached to pendulum 12a. Thus pendulum 12a is pivotally supported by the damping plates. In addition to serving as mounting means for the pendulum the damping plates also act as vanes to damp the motion of the pendulum assembly about bearings 91. A stop screw 99 is fastened to bar 93 and serves to adjust the zero position of pendulum 12a.

Suitably mounted on shaft 9a adjacent its lower end is a mirror 22a. Likewise mirror 21a is attached to the lower end of bar 23. As in the embodiment of Figure 1 pivotal motion of pendulum 12a is translated into rotational motion of shaft 9a by means of wires 17a and 18a wound in opposite directions around spools 15a and 16a, wire 18a being fastened to the bottom of pendulum 12a and wire 17a being fastened to extension 14a on the top of pendulum 12a. Holes 102 are drilled through bar 93 so that wires 17a and 18a may pass through the bar for proper alignment.

Supported on a lower shelf 100 within case 1a by means of bearing 101 is a geared wheel 26a which meshes with a pinion gear 32a fastened to shaft 31a driven by power source 33a positioned in the lower portion of case 1a. A bracket 27a extends upward from wheel 26a and supports light source 28a and sensitive cell 29a close to the exterior of the lower portion 77 of the transparent case so that the light source and cell will be rotated about the case to reflect light from the mirrors in the same manner as in the embodiment of Figure 1.

As shown in Figure 8 which is a sectional plan view taken on line VIII—VIII of Figure 7 it is preferred that mirror 21a be a double mirror having two plane surfaces set at an angle to each other so that the mirror will reflect a split beam of light to facilitate distinguishing the kicks between mirrors 21a and 22a on the record.

It is to be understood that the specific forms of apparatus presented in the drawings are by way of example and that the invention is not restricted thereto, but that obvious variations thereof may be made by persons skilled in this particular art without departing from the scope of the invention which is to be limited only by the following claims.

What is claimed is:

1. An inclinometer assembly comprising in combination a housing, a central vertical shaft mounted in said housing, a second vertical shaft mounted eccentric of and parallel to said first shaft and adapted for free movement about the axis of said first shaft, at least one of said shafts being rotatable on its own axis, a pendulum support bracket having a fulcrum point eccentric of the center of said first shaft, said bracket being mounted in said housing for free movement of said fulcrum point in a circle about the axis of said first shaft, a pendulum pivotally mounted on the fulcrum point of said pendulum support bracket, means connecting said pendulum with a selected one of said shafts so as to cause rotation of said shaft with respect to the other of said shafts upon pivotal movement of said pendulum on said fulcrum point, a mirror mounted vertically on said central shaft, a second mirror mounted vertically on said second shaft, a source of light adapted to revolve about said mirrors, a photosensitive cell adapted to revolve about said mirrors in fixed relation to said light source and so positioned as to receive reflected light from each of said mirrors during some portion of a revolution about said mirrors, and means for revolving said light source and said photosensitive cell about said mirrors at a uniform rate.

2. Inclinometer assembly according to claim 1 in which said means connecting said pendulum with said selected shaft so as to cause rotation of said shaft comprises a pair of flexible lines attached respectively to portions of said pendulum above and below said fulcrum point and wound in opposite directions about said selected shaft.

3. Inclinometer assembly according to claim 2 in which said means connecting said pendulum with said selected shaft comprises a toothed member attached to one end of said pendulum and engageable with a pinion gear mounted on said selected shaft.

4. Inclinometer assembly according to claim 2 in which one of said mirrors is adapted to reflect more light than the other of said mirrors.

5. Inclinometer assembly according to claim 2 in which one of said mirrors is coated with a film of filtering material.

6. Inclinometer assembly according to claim 2 in which one of said mirrors comprises two plane surfaces set at a small angle to each other.

7. An inclinometer assembly comprising in combination a housing, a central vertical shaft rotatably held within said housing, a pair of brackets attached to said central shaft and supporting between them a second vertical rotatable shaft, a mirror mounted vertically on said central shaft, a second mirror mounted vertically on said second shaft, a pendulum support bracket attached to said central shaft, a pendulum pivotally mounted on said pendulum support bracket, means connecting said pendulum with said second shaft so as to cause rotation of said second shaft upon pivotal movement of said pendulum, a source of light adapted to revolve about said mirrors, a photosensitive cell adapted to revolve about said mirrors in fixed relation to said light source and so positioned as to receive reflected light from each of said mirrors during some portion of a revolution about said mirrors, and means for revolving said light source and said photosensitive cell about said mirrors at a uniform rate.

8. An inclinometer assembly comprising in combination a fluid tight chamber at least a portion of which is transparent to light, bearing supports mounted within said chamber at the top and bottom thereof, a central, rotatable shaft held vertically between said bearing supports, a pair of brackets attached to said central shaft, a second rotatable vertical shaft held between said brackets, a mirror mounted vertically on said central shaft, a second mirror mounted vertically on said second shaft, a pendulum support bracket attached to said central shaft, a pendulum pivotally mounted on said pendulum support bracket, means connecting said pendulum with said second shaft so as to cause rotation of said second shaft upon movement of said pendulum from its normal position, a source of light adapted to revolve about the exterior of said chamber, a photosensitive cell adapted to revolve about the exterior of said chamber in fixed relation to said light source, said light source and said photosensitive cell being so positioned with respect to said mirrors and to said transparent portion of said chamber that each of said mirrors will reflect light from said light source into said photosensitive cell during some portion of a revolution of said light source and said photosensitive cell about said chamber, and means for revolving said light source and said photosensitive cell at a uniform rate.

9. Inclinometer assembly according to claim 8 in which said transparent portion of said chamber comprises a cover having transparent sides.

10. An inclinometer assembly comprising in combination a housing, a central vertical shaft rotatably mounted in said housing, a pair of vertically spaced brackets mounted for rotation on pivots essentially coaxial with said shaft and having laterally extending arms, a second vertical shaft held by said brackets between said arms in essentially parallel relation to said first shaft, a pendulum support bracket held by said second shaft intermediate its ends, a pendulum pivotally mounted on said support bracket, means connecting said pendulum with said central shaft so as to cause rotation of said shaft with respect to said second shaft upon pivotal movement of said pendulum, a mirror mounted vertically on said first shaft, a second mirror mounted vertically on said second shaft, a light source adapted to revolve about said mirrors, a photosensitive cell adapted to revolve about said mirrors in fixed relation to said light source and so positioned as to receive reflected light from each of said mirrors during some portion of a revolution about said mirrors, and means for revolving said light source and said photosensitive cell about said mirrors at a uniform rate.

11. An inclinometer assembly comprising in combination a fluid tight chamber at least a portion of which is transparent to light, bearing supports mounted adjacent the top and bottom of said chamber, a pair of bearing blocks each having bearing members coaxially aligned on opposite faces of the block, a bearing of each bearing block being rotatably fitted into one of said bearing supports, a first central shaft rotatably held vertically between the remaining bearings of the said bearing blocks, a second shaft or bar fastened to said bearing blocks in essentially parallel relation to said first shaft, a pair of flat plate members fastened to said second shaft or bar in essentially parallel vertical relation, a mirror mounted vertically on said first shaft, a second mirror mounted vertically on said second shaft, a pendulum disposed between said plates and pivotally mounted thereon, means connecting said pendulum with said first shaft so as to cause rotation thereof, a source of light adapted to revolve about the exterior of said chamber, a photosensitive cell adapted to revolve about the exterior of said chamber in fixed relation to said light source, said light source and said photosensitive cell being so positioned with respect to said mirrors and to said transparent portion of said chamber that each of said mirrors will reflect light from said light source into said photosensitive cell during some portion of a revolution of said light source and said photosensitive cell about said chamber, and means for revolving said light source and said photosensitive cell at a uniform rate.

12. Inclinometer assembly according to claim 11 in which said mirrors, said light source and said sensitive cell are all disposed adjacent the lower end of said chamber, thereby eliminating interference from air bubbles in a liquid filling said chamber.

ALEXANDER B. HILDEBRANDT.

No references cited.